J. P. CLEAL.
CASH REGISTER.
APPLICATION FILED JULY 19, 1905.

1,006,358.

Patented Oct. 17, 1911.
11 SHEETS—SHEET 1.

J. P. CLEAL.
CASH REGISTER.
APPLICATION FILED JULY 19, 1905.

1,006,358.

Patented Oct. 17, 1911.
11 SHEETS—SHEET 2.

Witnesses
Wm. O. Henderson
Earl W. Beust

Joseph P. Cleal, Inventor
by Frank Parker Davis
and J. B. Hayward
Attorneys

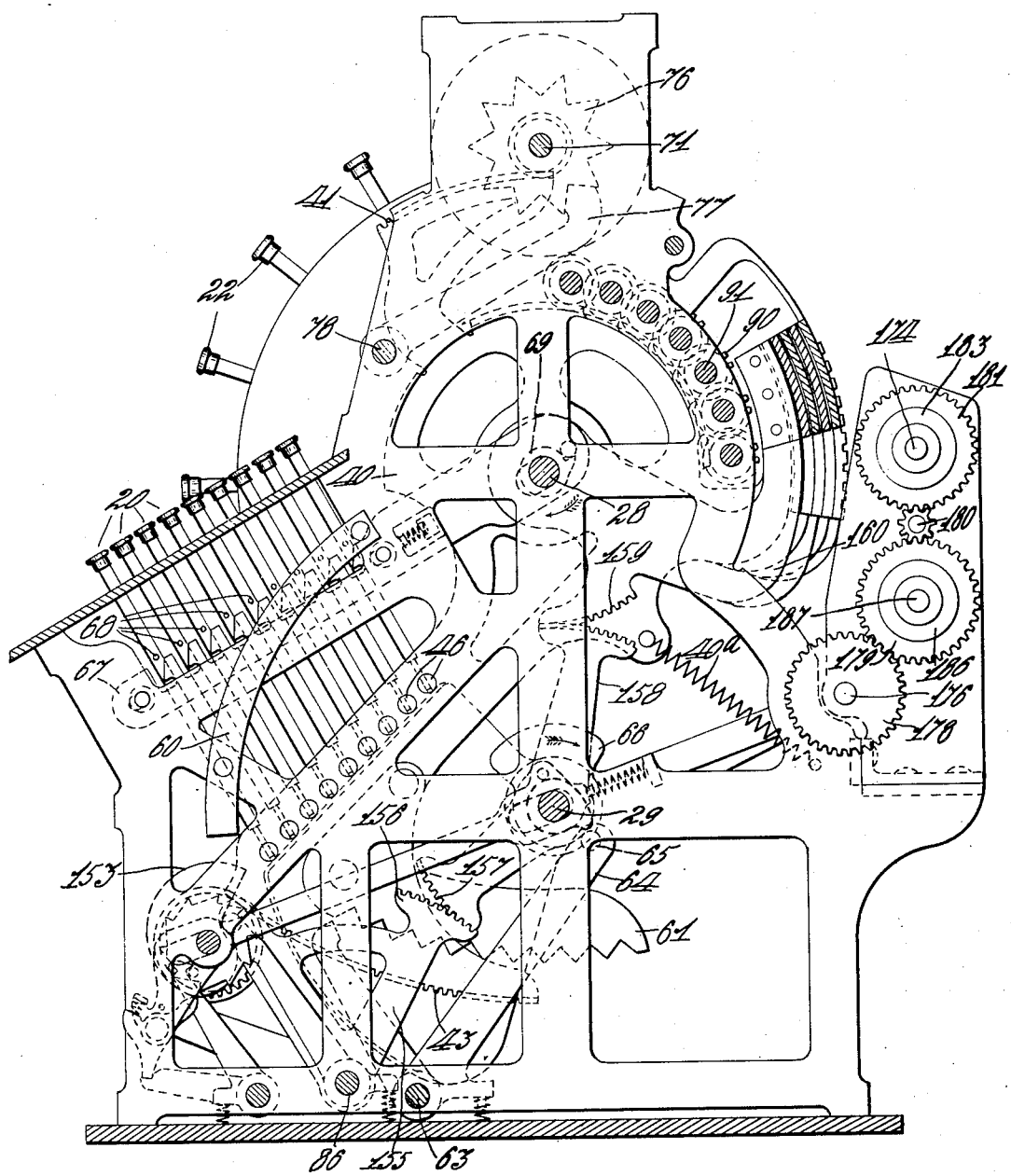

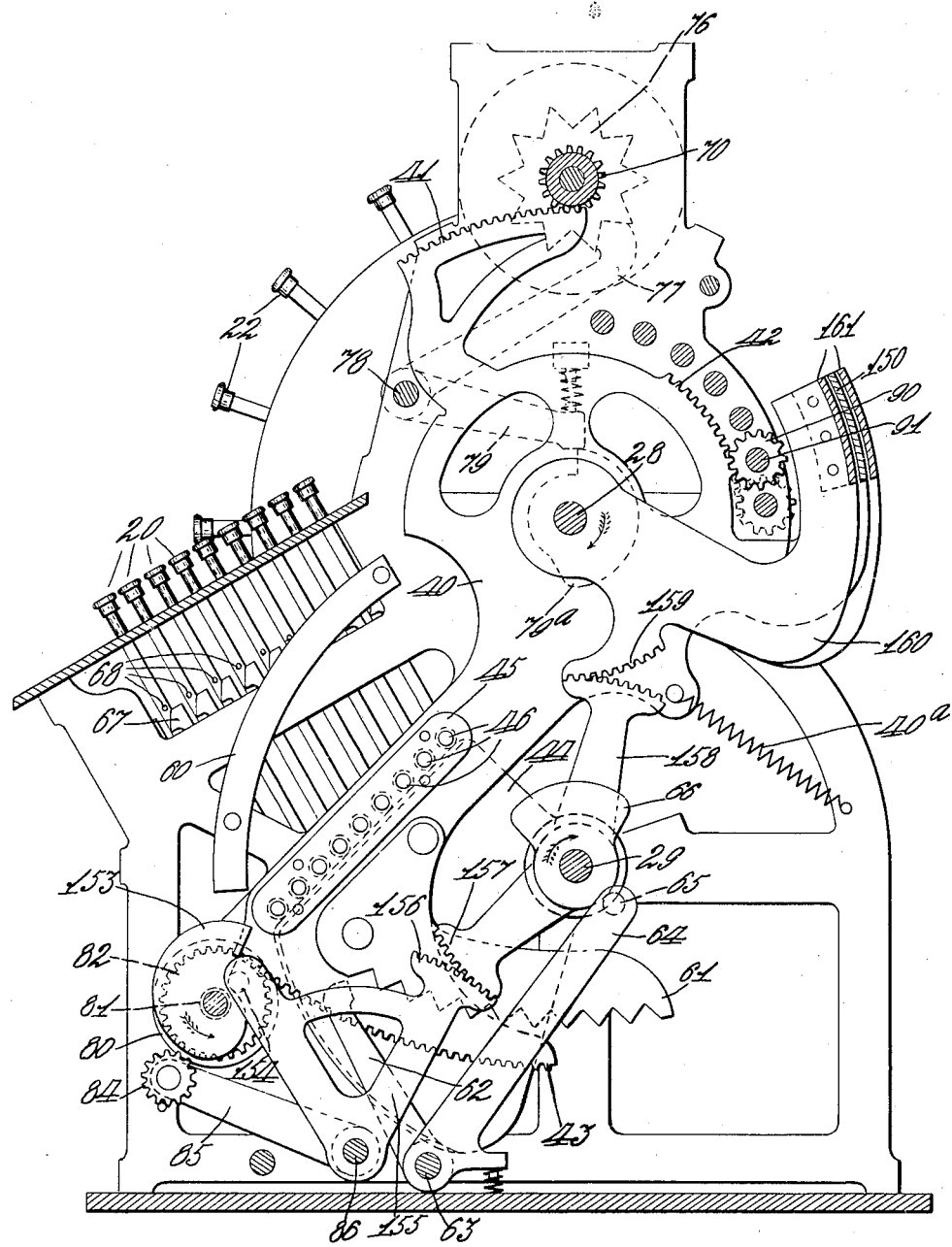

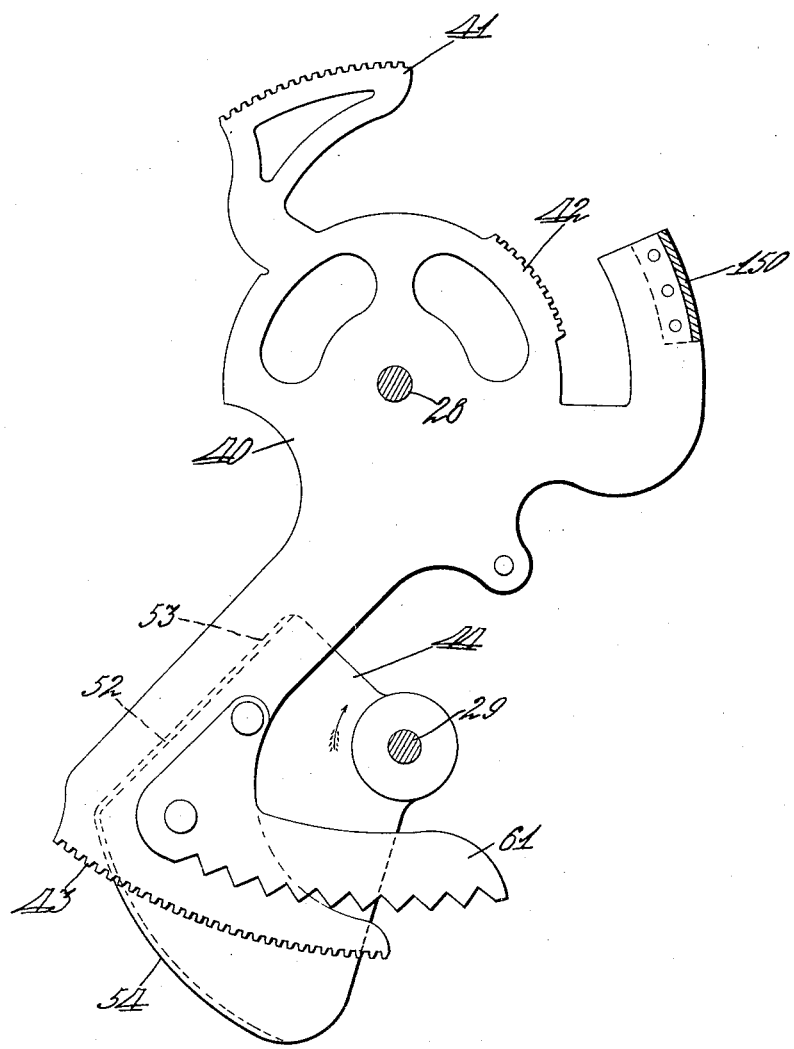

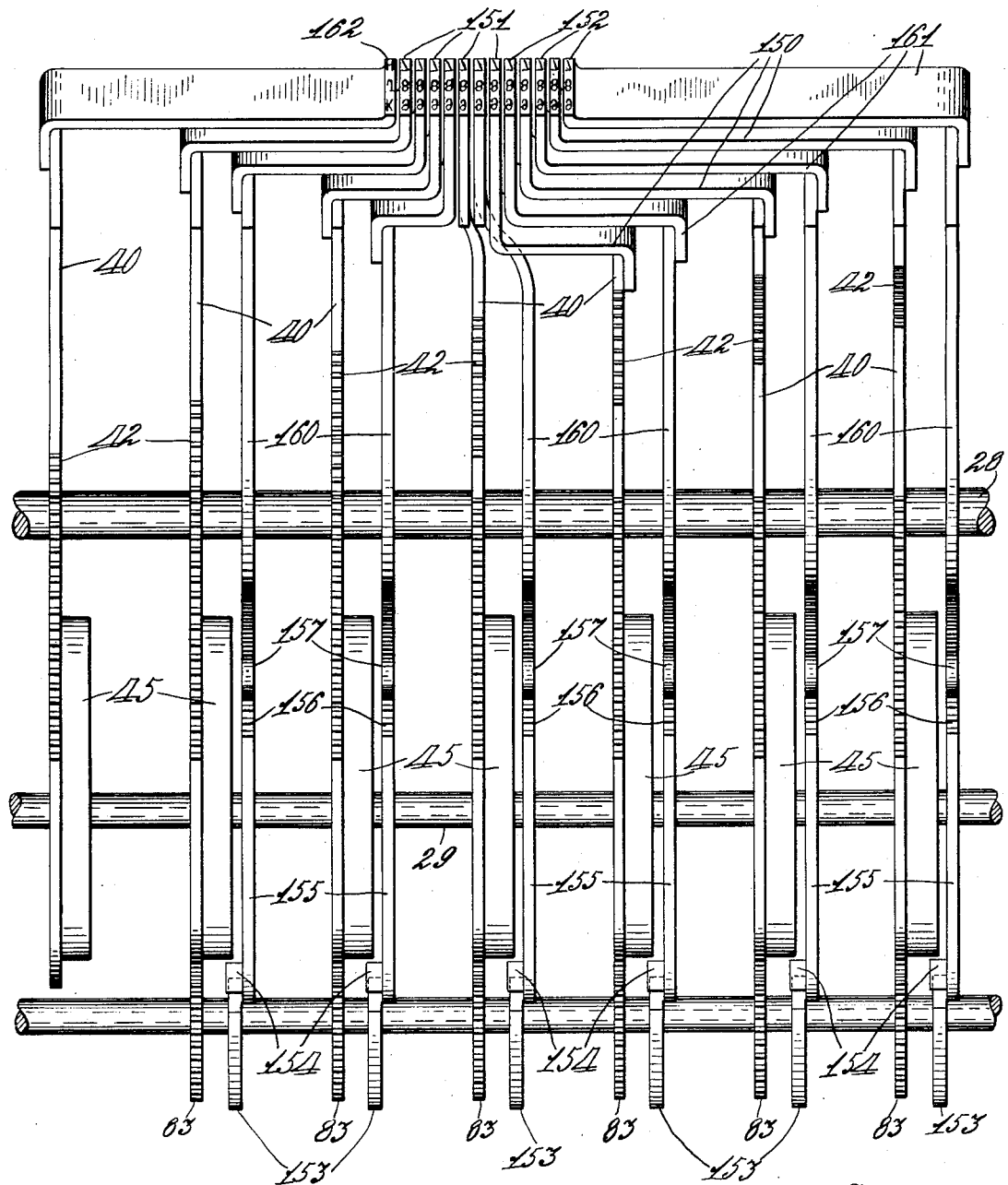

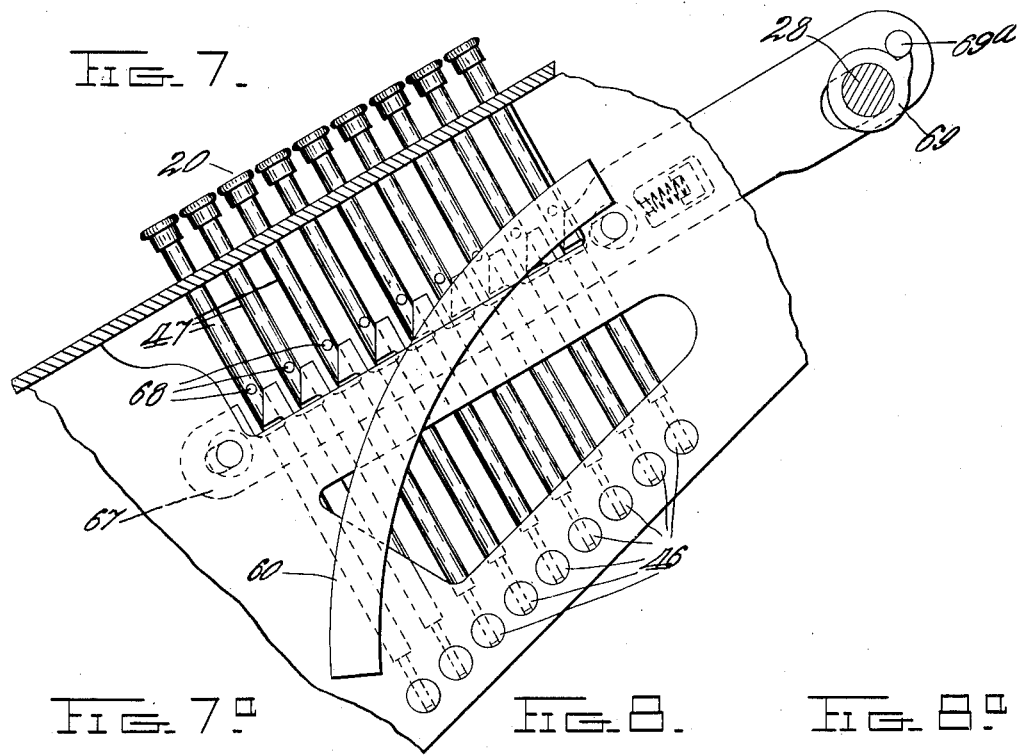
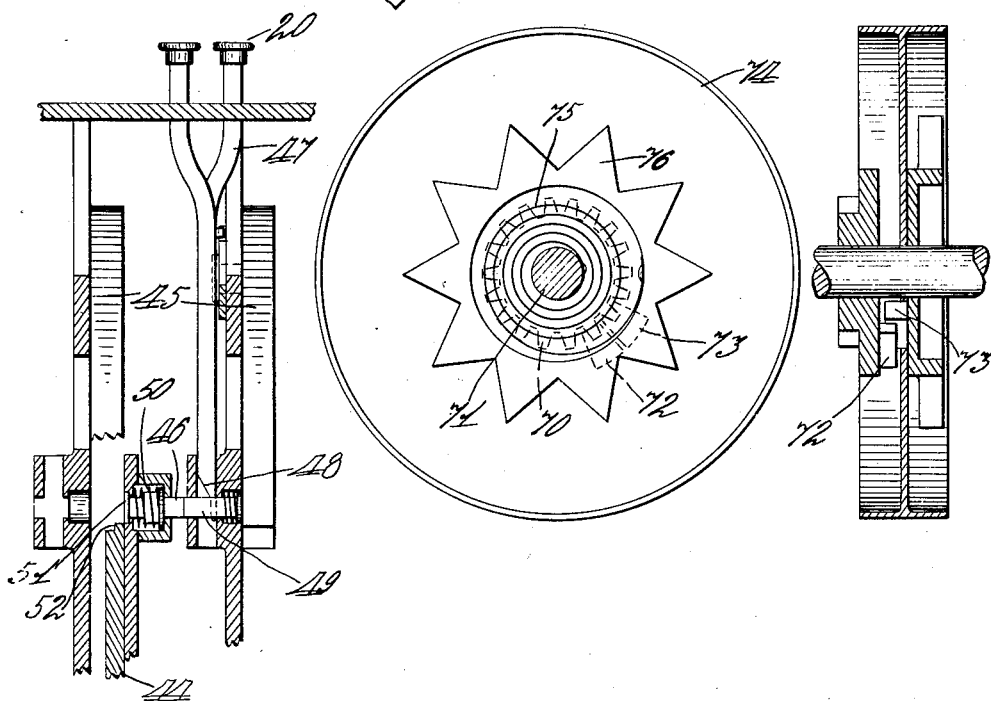

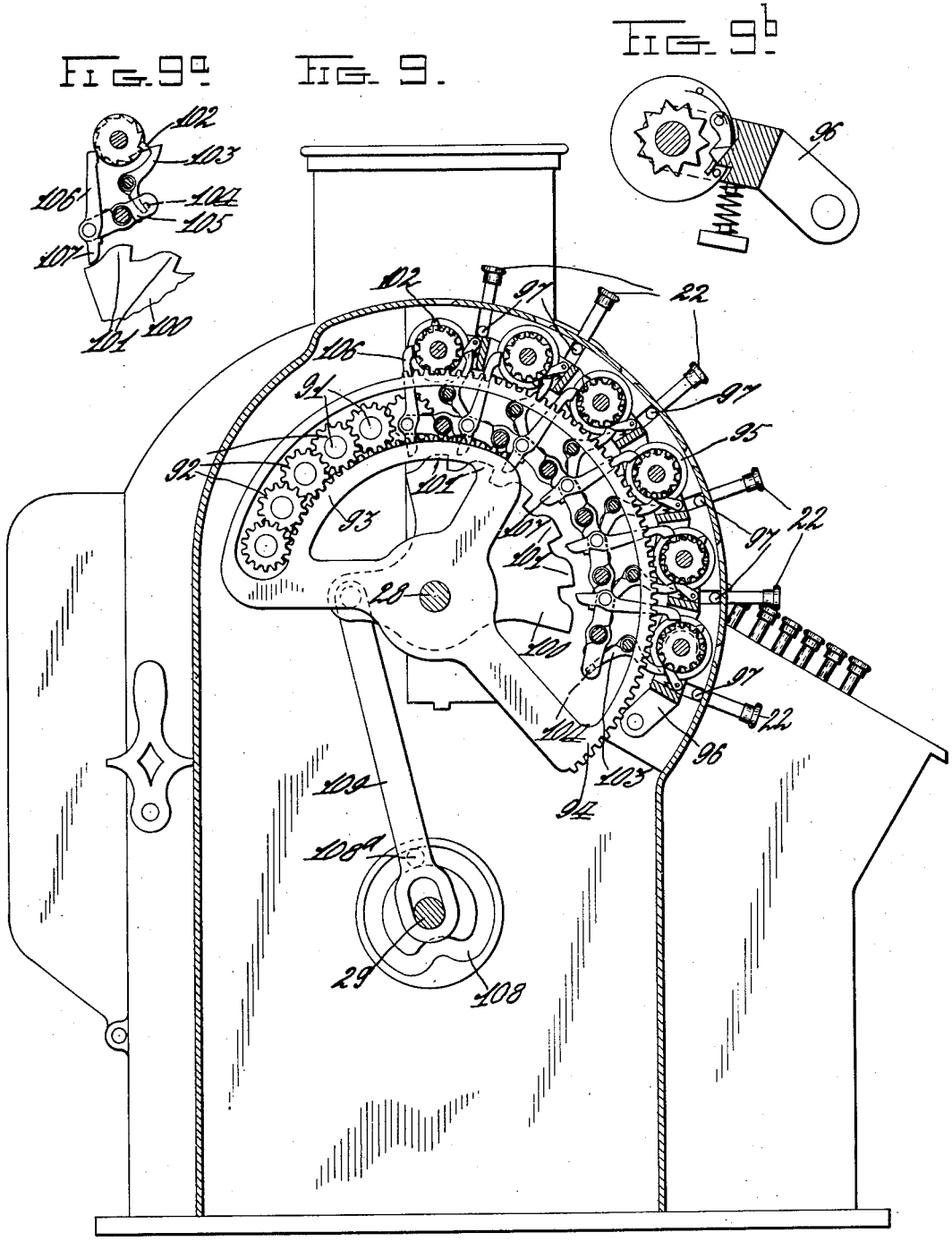

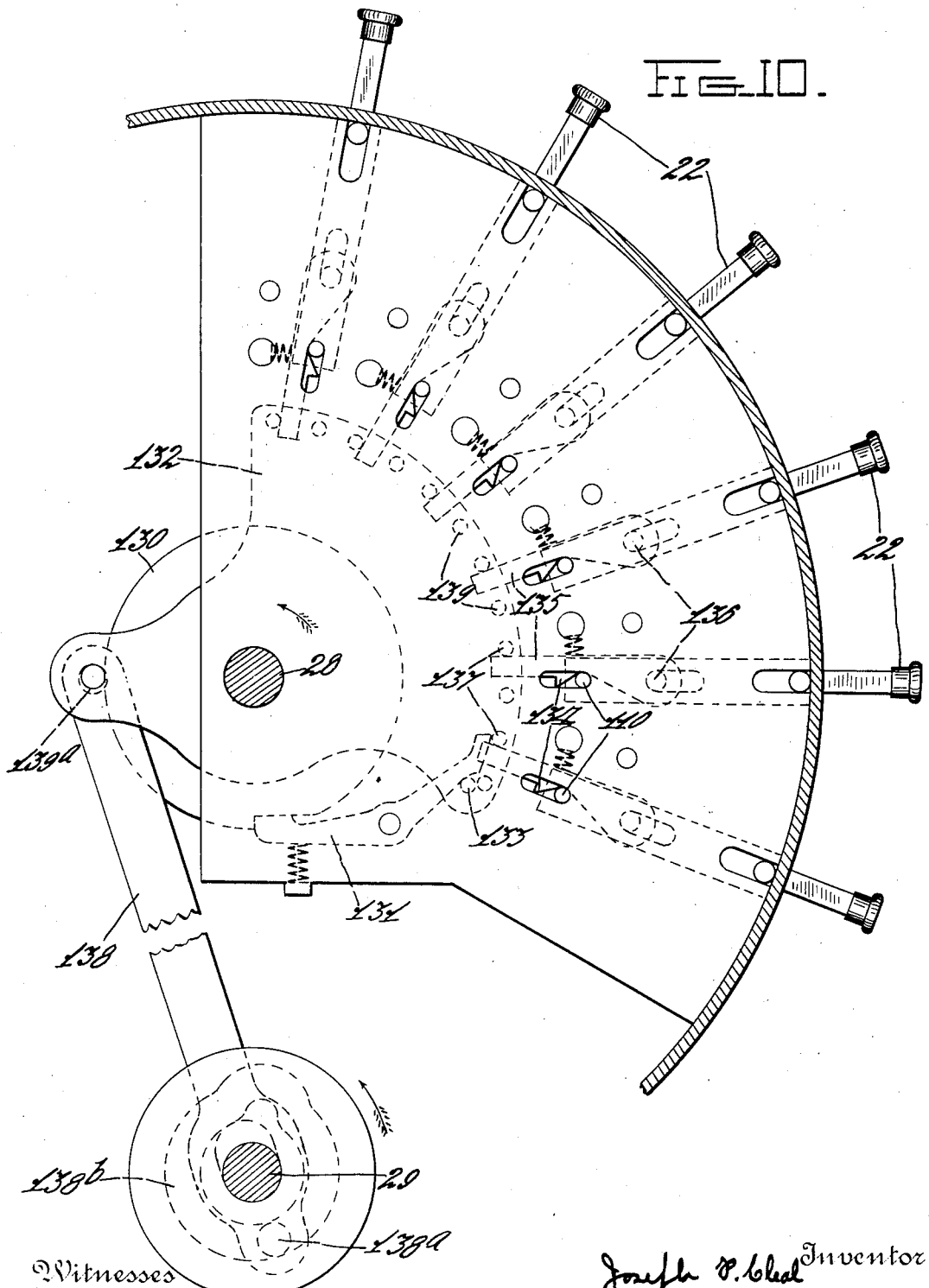

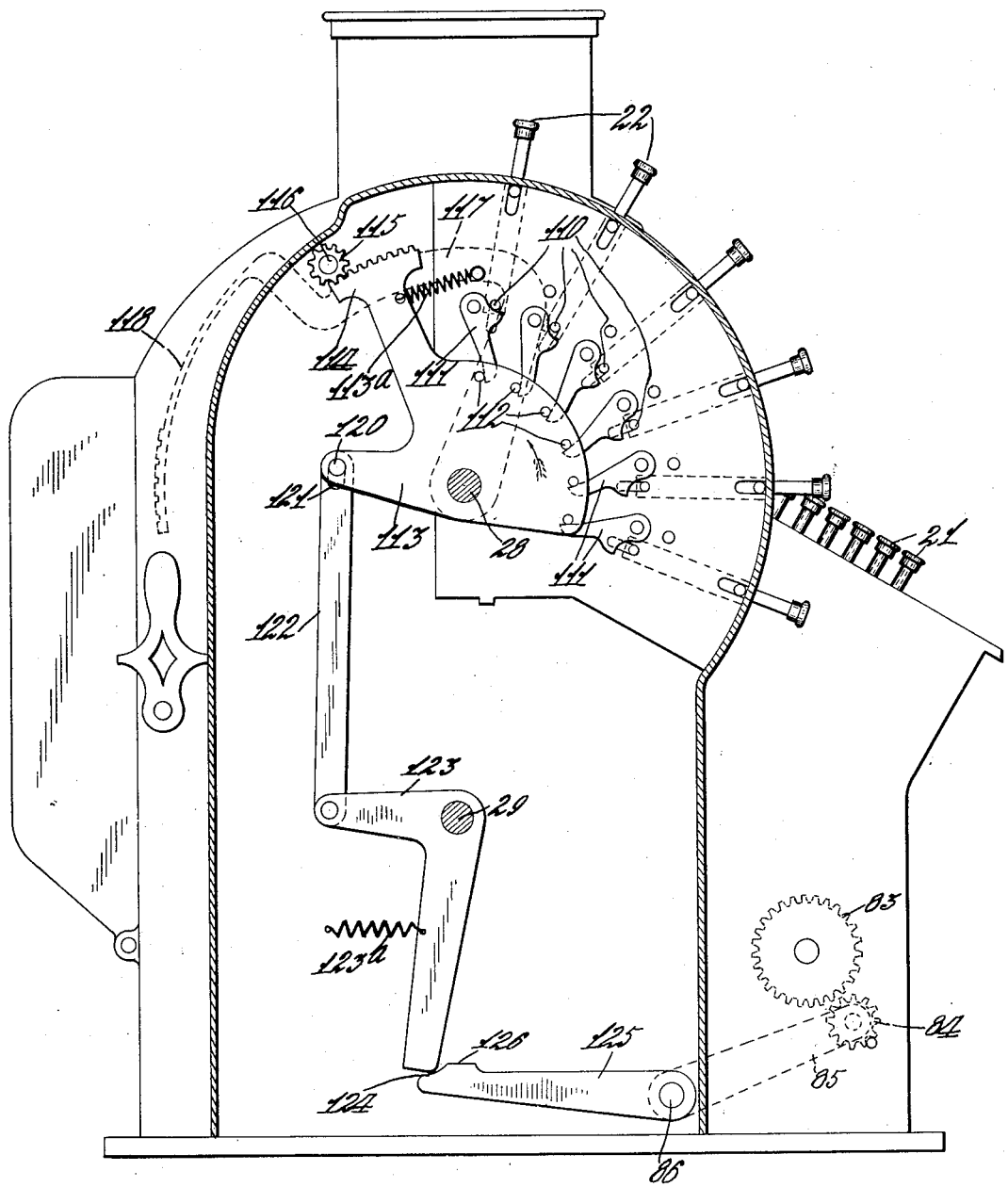

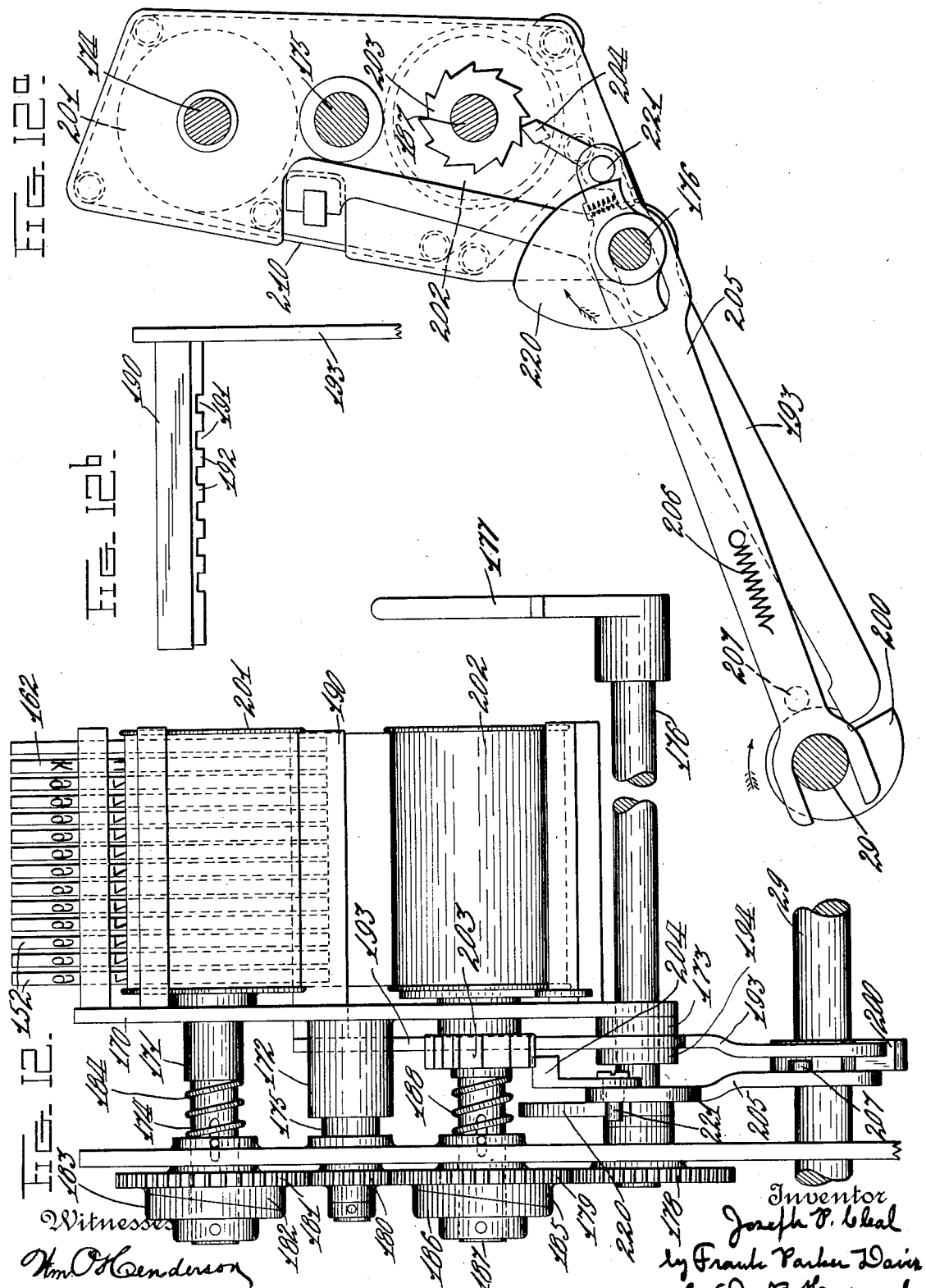

UNITED STATES PATENT OFFICE.

JOSEPH P. CLEAL, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

1,006,358.  Specification of Letters Patent.  Patented Oct. 17, 1911.

Application filed July 19, 1905. Serial No. 270,324.

*To all whom it may concern:*

Be it known that I, JOSEPH P. CLEAL, a citizen of the United States, residing at Dayton, in the county of Montgomery and State of Ohio, have invented certain new and useful Improvements in Cash-Registers, of which I declare the following to be a full, clear, and exact description.

This invention relates to improvements in that class of cash registers in which accounting devices are provided for registering classified transactions in different independent counters and printing the detailed items of the various transactions, and has among its principal objects to provide improved devices in connection with the printing of the totals of the amounts previously registered or printed, and in connection therewith to provide certain improvements in the means of setting the printing devices.

With these and incidental objects in view, the invention consists in certain novel features of construction and combinations of parts, the essential elements of which are set forth in appended claims and a preferred form of embodiment of which is hereinafter specifically described with reference to the drawings which accompany and form part of this specification.

Figure 1:
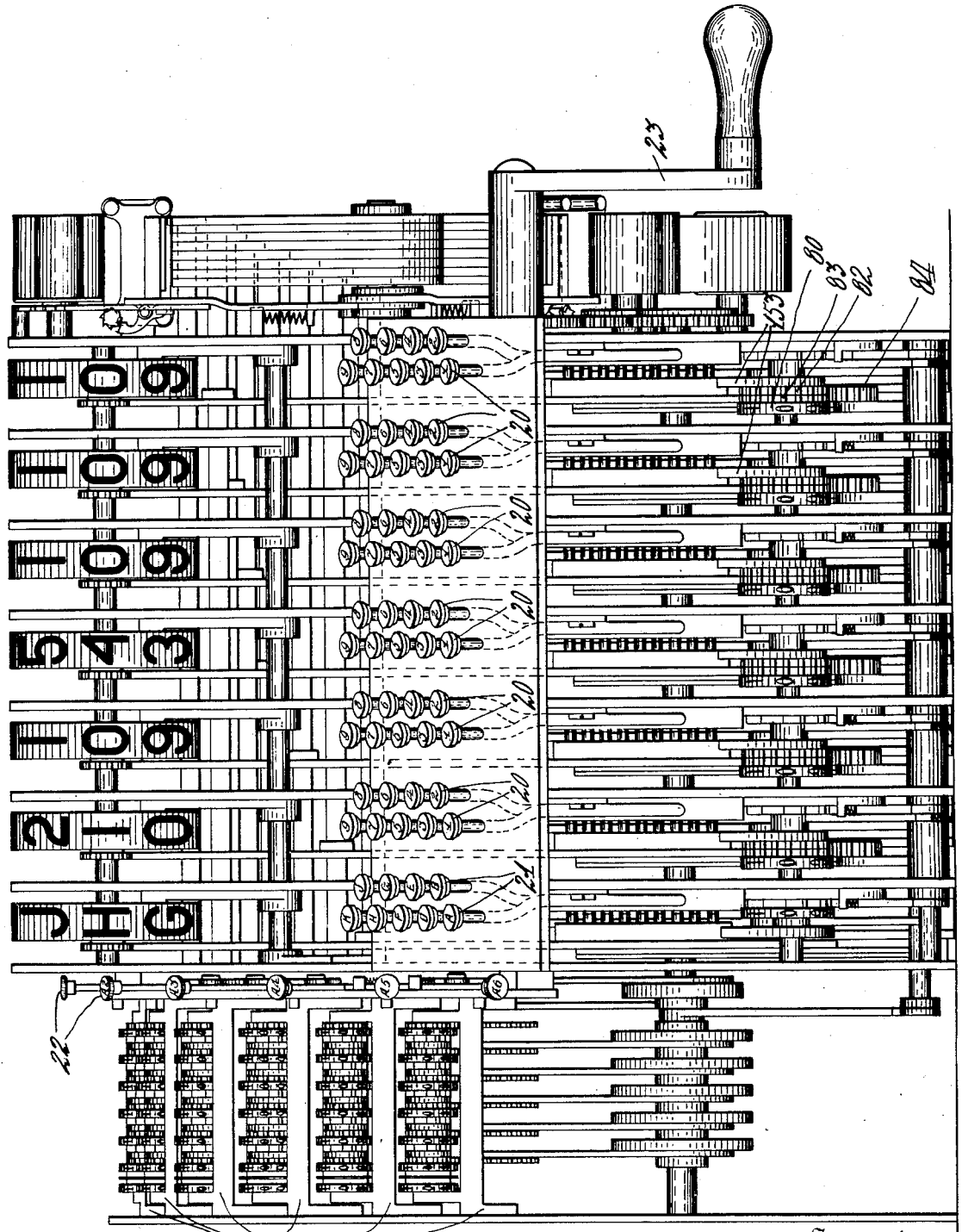
Figure 2:
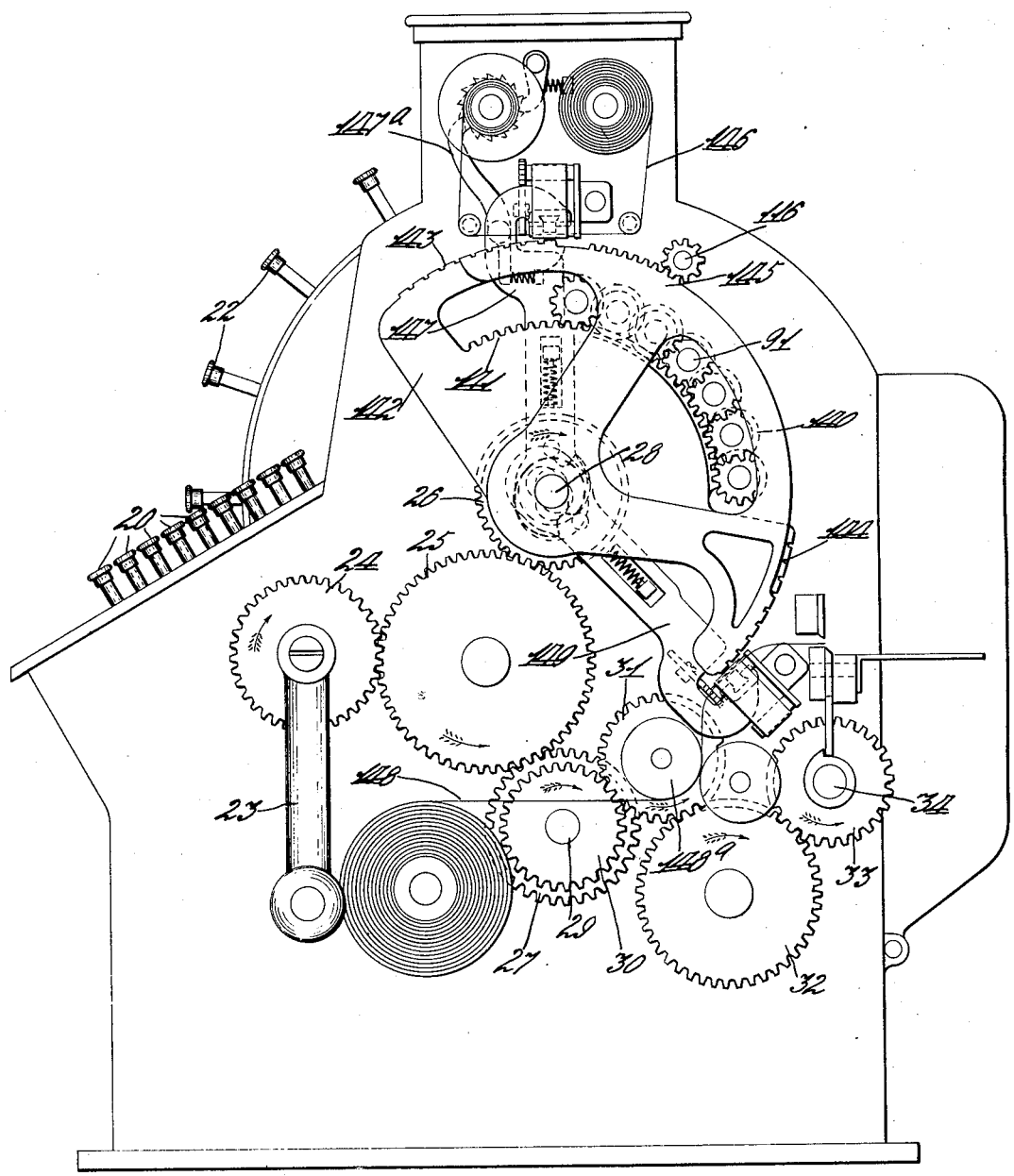

Of said drawings: Figure 1 represents a front elevation of the cash registers to which these improvements are applied. Fig. 2 represents a side elevation of the right-hand end of the machine. Fig. 3 represents a vertical sectional view just inside the printing attachment on the right-hand end of the machine. Fig. 4 represents another vertical section of the machine. Fig. 5 represents a detail view of one of the setting segments and one of the main actuating cams. Fig. 6 represents a detail top view of the printing bars and connections. Figs. 7 and 7ª represent detail views of a portion of the key board showing also the key release mechanism. Figs. 8 and 8ª represent detail views of a portion of the indicator mechanism. Fig. 9 represents an end elevation of the left-hand end of the machine showing the arrangement of the multiple counters. Fig. 9ª represents a detail of the transfer mechanism for the multiple counters. Fig. 9ᵇ represents a detail of one of the counter frames for the multiple counters. Fig. 10 represents a detail view of one of the detent plates connected with the special keys for the multiple counters. Fig. 11 represents a detail view showing the mechanism connected with throwing in the grand total counter in connection with the use of certain of the special keys. Fig. 12 represents a detail rear view of a portion of the printing mechanism in connection with the printing of totals. Fig. 12ª represents a side view partially sectionalized of the mechanism shown in Fig. 12. Fig. 12ᵇ represents a detail view of the printing platen.

Referring to Fig. 1 it will be seen that there are six banks of amount keys 20, a bank of clerks' keys 21 and a bank of special keys 22, there being six of these special keys numbered from $A^1$ to $A^6$ inclusive, these special keys being designed to cause the registration upon the particular one of the multiple counters as desired, there also being a grand total counter, all of which will be described more in detail later.

Power is imparted to the machine for performing the various functions, by means of a crank handle 23 (see Fig. 2) which turns a gear 24 which meshes with a gear wheel 25, which wheel in turn meshes with an upper gear wheel 26 and a lower gear wheel 27 which wheels are respectively fast upon an upper operating shaft 28 and a lower operating shaft 29. A small gear wheel 30 also fast on the lower shaft 29 meshes with a gear wheel 31 which latter meshes with a gear wheel 32, and the gear wheel 32 meshes with a gear wheel 33 fast upon a shaft 34. The arrows in Fig. 2 will readily show the directions of rotation of the various gear wheels and their shafts upon the operation of the handle 23.

*Actuating mechanism.*—The mechanism for securing differential extents of movements of the accounting elements under the control of the amount keys will now be described.

Each bank of amount keys has coöperating therewith an actuating segment 40 (see Fig. 5) which is of rather irregular contour. This segment is pivoted loosely upon the upper operating shaft 28 and comprises three rack portions namely an indicator rack 41, a printer setting rack 42 and a counter rack 43. This segment 40 is arranged to be actuated upon and moved differentially by means of an actuating cam 44 which is fast upon the lower operating shaft 29, the shape of which cam is shown most clearly in Fig. 5. At each operation of the machine, the shaft 29 is arranged to have one complete revolution and thereby carry the actuating cam 44 through one complete revolution, there of course being the segment 40 has upon its right-hand side one cam 44 and one segment 40 for each bank of amount keys. As shown in Fig. 4 a box 45 containing a series of nine plungers 46, the amount keys being arranged to force out one or the other of these plungers to carry the particular plunger into the path of the actuating cam 44 so that the segment 40 will be picked up by the cam and moved different distances thereby according to the plunger which has been projected. This mechanism is shown most clearly in Figs. 7 and 7ª. The stems 47 of the amount keys extend downward and are beveled at 48 at their lower ends and operate upon spring pressed plungers 49 so as to force said plungers to the left (see Fig. 7ª) when the amount key is depressed. This forcing to the left of the plunger 49 also causes the forcing to the left of the corresponding plunger 46 against the end of which the corresponding plunger 49 abuts, there being nine of these plungers 49 and nine of the plungers 46 corresponding to the series of nine amount keys in one bank. When the plunger 46 is in this manner forced to the left against the tension of its spring 50, the head 51 thereof is forced so far to the left that upon the rotary movement of the cam 44 the flange portion 52 of said cam will lock in by the side of the plunger head 51 and prevent the plunger from returning to normal position. The continued rotary movement of the cam 44 acts through the plunger 46 to carry the lower end of the segment 40 upward to a certain extent according to the respective position of the plunger 46. The shape of the cam 44 and the arrangement of the plungers 46 is such that the cam will give the segment differential extents of movements exactly corresponding to the value of the key depressed, that is the 1 key being the lowest down in the bank is operated upon by the lower end of the straight portion 53 of the cam 44, so that after the cam 44 has moved slightly, the segment 40 will have been moved by one degree or unit. The segment will then have been raised so that the curved portion 54 acts upon the plunger of this No. 1 key and since the curved portion 54 is concentric to the center of movement of the cam, namely the shaft 29, the cam no longer exerts any lifting effect upon this segment. Whereas, when the 9 key is depressed, this key being at the upper end of the bank, then when its plunger is forced to the left it will be engaged by the upper end of the aforesaid straight portion 53 of the cam 44 and the rotary movement of the cam 44 will cause the edge 53 to lift upon the plunger of this 9 key and thereby actuate the segment 40 through nine degrees of movement, the 9 plunger sliding downward along the straight portion 53 until it comes to the curved portion 54 when of course the further movement of the segment 40 ceases while the cam continues its rotary movement, the segment being held in its operated position so long as the concentric curved portion 54 is maintained in engagement with the operated plunger, during which maintenance of the setting position the printing may take place. As soon as the cam has been moved so that the concentric portion 54 has moved past the operated plunger, the segment is free to return to normal position under the tension of its spring 40ª (see Figs. 3 and 4). Of course when the segment 40 is in normal position all its nine plungers 46 are in lateral alinement with the key plungers 49, but as soon as the segment begins to move under the actuation of the cam 44 the operated plunger 46 is withdrawn from alinement with its corresponding plunger 49 which is originally forced out to the left, but the plunger 46 cannot return to normal position because its head 51 is engaged by the aforesaid flange 52 of the actuating cam.

*Overthrow preventer.*—For the purpose of preventing excessive movement of the segment 40 beyond the movement which it should be moved as determined by the key depressed, an overthrow plate 60 (see Figs. 3, 4 and 7) is provided which is made fast to the frame-work of the machine and is curved in such manner that when the plunger 46 for the lower or 1 key is forced to the left, and the plunger then lifted by the cam 44, this plunger will strike the inside periphery of the lower end of the curved overthrow plate 60 and thereby overthrow movement of the segment 40 will be prevented since the plunger cannot be forced beyond this plate 60; and similarly if the upper or nine key is depressed its plunger will be free to be carried around by the actuating cam 44 until nine units of movement have been imparted thereto, at which time the 9 plunger has been carried high enough to contact with the inside periphery of the upper end of this curved plate 60 and thus overthrow movement will be prevented.

From this description it will be obvious that the segments 40 are given oscillatory movements under the actuation of continuously rotating actuating cams; which cams positively move the segments their differential distances and then hold the same in displaced position for a certain period and then permit the segments to return to normal position while the cams complete their rotary movements.

Each segment 40 carries an alining plate 61 (see Figs. 3, 4 and 5) which is formed with a series of notches engaged by an alining pawl 62 fast to a transverse shaft 63 which shaft carries an arm 64 at the upper end of which is a pin 65 operated upon by a cam 66 on the shaft 29 so that the segments 40 will all be properly alined and locked as soon as they have been set.

*Key detents.*—The keys 20 are held in depressed position by means of detent plates 67 (see Fig. 7) which are formed with the ordinary hooked noses for latching over the key pins 68, and a cam 69 fast on the upper shaft 28 operates upon a pin 69ª on the end of the detent plate to force the detent plates rearward at each operation of the machine and thereby release the keys.

*Indicator mechanism.*—The indicator rack 41 of each segment 40 meshes with a gear wheel 70 (see Figs. 4 and 8) which is loosely mounted on a transverse indicator shaft 71, and as shown in Fig. 8ª this gear wheel 70 has an inner flange to which is made fast a lug 72, which lug is adapted to act against a corresponding lug 73 formed on the side of the inner partition of the rotary indicator 74, so that the setting movement of the indicator rack 41 will through the gear 70 cause the lug 72 to act against the lug 73 and move the indicator ahead to proper setting position against the tension of its spring 75 which normally tends to hold the indicator in zero position. An alining wheel 76 is engaged by an alining and locking pawl 77 fast on a transverse shaft 78 to which shaft is made fast an arm 79 which is operated upon by a cam 79ª fast upon the upper operating shaft 28 so that at the beginning of an operation of the machine the locking pawls 77 will all be released to permit the indicators to spring back to normal zero position and then the same may be reset and after being set will be again locked in setting position while the actuating segments 40 are returned to normal position.

*Total counter.*—As shown in Fig. 1 the total counter is situated at the lower front side of the machine. The counter wheels 80 have the usual numbers on their periphery and each wheel is connected by a sleeve 81 (shown by dotted lines in Fig. 4), to a gear wheel 82 and between this gear wheel 82 and the numeral wheel is a companion gear wheel 83 (see Fig. 1) which is loosely mounted on the aforesaid sleeve 81, and the aforesaid counter rack 43 of the actuating segment 40 meshes with this intermediate and loosely mounted gear wheel 83. The gear wheels 82 and 83 are arranged to be coupled together by means of a wide idle pinion 84. There is one of these idle pinions for each set of companion gear wheels for each counter wheel, and these idle pinions are mounted upon arms 85 fast to a rock shaft 86 which shaft is rocked by a mechanism to be presently described, so as to carry all of the idle pinions into engagement with their companion gear wheels so that the operation of the actuating segment 41 will cause the actuation of the gear wheel 81 and since this gear wheel is coupled to its companion gear wheel, the counter wheel will thereby be actuated, and upon the return movement of the actuating segment, the idle pinions are all dropped downward again out of mesh so that the counter is in this manner moved forward in one direction to the extent corresponding to the differential movement of the actuating segment, but is not returned with the actuating devices. Suitable transfer mechanism is provided for performing the ordinary transition movements from one counter wheel to another.

*Multiple counter mechanism.*—The aforesaid printer setting racks 42 of the actuating segments 40 are utilized not only to set up printing devices as will be presently described, but are also utilized to actuate another set of racks for the operation of any desired one of a series of multiple counters. As shown in Figs. 3, 4 and 9, each rack 42 meshes with a pinion 90 fast upon a transverse shaft 91 which shaft extends laterally in both directions and on the right-hand end thereof has pinions for setting up printer racks as will be presently described, and the left end extensions of the shafts 91 carry pinions 92 as shown in Fig. 9, which pinions mesh respectively with a series of segmental racks 93. Each of these segmental racks comprises part of a frame work carrying on the forward side thereof a multiple counter segmental rack 94, so that the differential movements of the setting segments 40 are exactly reproduced in these multiple counter segments 94. Each of the multiple counters 95 is arranged around the peripheries of these actuating racks 94, being as shown in Fig. 9ᵇ each mounted upon a pivoted frame 96 which frame is arranged to be struck by a pin 97 on the side of the special keys 22 so that when any one of these keys is depressed its pin will strike the framework of its corresponding counter and carry the counter downward against spring tension into mesh with the actuating racks 94 so that by this means any desired counter may be selected by the depressing of the corresponding key 22.

Between the adjacent parts of the actuating segments 94 are situated transfer operating disks 100 formed with operating projections 101. Each counter wheel is provided with a tripping nose 102 (see Fig. 9ª), a tripping pawl 103 the tail of which abuts against a lug 104 upon a small lever 105 carrying at its other end a transfer pawl 106, the tail 107 of which transfer pawl is arranged to be acted upon by the operating projections 101. Normally the position of the transfer pawls 106 is as shown in Fig. 9 in which the levers 105 are approximately parallel to the actuating segments 94 and the tail of the pawl 103 engages the upper side of the lug 104 so as to hold the lever 105 in this position with the tail 107 of the transfer pawl 106 raised and out of position to be acted upon by the transfer disk 100. When however the counter has made a complete revolution and the tripping nose 102 rocks the tripping pawl 103 outward, this permits the other end of the lever 105 to drop thereby carrying the tail 107 of the transfer pawl downward into the path of its corresponding operating projection 101, so that upon the operation of the machine, a box cam 108 acts upon a pin 108$^a$ fast upon the side of a link 109 so as to pull link 109 downward and thereby rock the transfer disk 100 about its pivotal point sufficiently to cause the projection 101 to lift all of the transfer pawls that have been tripped and dropped in this manner and thereby give the ordinary unitary transfer movement to the counter wheels, and this movement again brings lug 104 under the pawl 103.

The throwing in of the grand total counter is effected only by means of the three upper special keys 22, while the three lower keys do not effect the throwing in of this total counter, so that the three upper keys might be used for such departmental cash transactions as it is desired to have added in to the main counter, whereas the three lower special keys might be used for the ordinary special transactions such as "charge," "paid out," and "received on account" which it is ordinarily desired not to add into the main counter, whereas of course the classified totals with the amounts added upon the respective multiple counters is preserved by means of these multiple counters. This control of the throwing in of the main total counter by these special keys is effected by the mechanism shown in Fig. 11. Each special key has a pin 110 on the side thereof which pin engages a pawl 111 pivoted to a part of the framework of the machine which pawl engages a pin 112 on the side of a disk 113 pivoted loosely about the upper shaft 28. It will be seen in Fig. 11 that the pin 110 of the uppermost key 22 rests against its pawl 111 while the other pins are spaced at greater and greater distances away from their respective pawls so that the uppermost key which has been designated as A$^1$ would give the disk 113 the greatest extent of movement about its pivotal point 28 while the lowermost key A$^6$ would give the least degree of movement to said disk. This differential movement of the disk 113 is utilized to set the special printer as will be described later more in detail, this setting movement taking place by means of the rack extension 114 which meshes with a pinion 115 fast upon a transverse shaft 116, which shaft 116 also has fast upon it near the center portion of the machine another pinion of the same size as said pinion 115 which pinion engages a rack formed on a curved arm 117 which is bent downward to be pivoted upon the aforesaid shaft 28. The rearward extension of this arm 117 is formed with a type arm 118 bearing six different type characters corresponding to the different special keys 22, these type carriers being brought to the printing line along with the amount type carriers as will be presently described in connection with the printing of the amounts.

The rearward extension of the disk 113 carries a pin 120 which plays in a slot 121 formed in a link 122 which is connected at its lower end to a bell crank lever 123 pivoted loosely upon the lower shaft 29, the lower end of which bell crank lever coöperates with the beveled end 124 of an arm 125 which is fast to the aforesaid transverse rock shaft 86 which carries the arms 85 carrying the idle pinions 84. From the position of the pin 120 and slot 121 in Fig. 11 it will be seen that the first part of the differential movement of the disk 113 is occupied with carrying the pin to the lower end of the slot 121, and that continued movement of the disk 113 causes the pin 120 to depress the link 122 and thereby rock the bell crank lever 123 to cause its lower end to act upon the arm 125 to rock the shaft 86 and throw all the idle pinions 84 into mesh with their companion gear wheels preparatory to the operation of the main total counter as above described. The length of the slot 121 is such that no one of the three lower keys A$^4$, A$^5$, or A$^6$ moves the disk 113 far enough to have any effect on the link 122, the key A$^4$ simply carrying the pin 120 just to the end of the slot 121, whereas the three upper keys A$^1$, A$^2$, and A$^3$ first move the pin down to the end of the slot 121 and then depress the link 122 to throw in the counter as above described. All of the three upper keys depress the arm 125 to the same extent, the uppermost key A$^1$ simply causing the lower end of the bell crank lever 123 to rest farther forward on the flattened portion 126 of the rearward extension of the arm 125. A spring 113$^a$ holds the disk 113 in normal position shown in Fig. 11, and a spring 123$^a$ holds the lower end of the bell crank lever 123 normally in rearward position as shown in Fig. 11 so that as soon as the depressed special key is released (as presently described) the disk 113 will return to normal position and the lever 123 will also return to normal position to permit the lever 125 to ascend and permit the idle pinions 84 to drop out of mesh again.

*Machine lock.*—The machine is normally locked until one of the special keys 22 has been depressed, this locking mechanism comprising a disk 130 (see Fig. 10) fast on the upper shaft 28 and formed with a locking notch engaged by a locking pawl 131. A disk 132 loosely pivoted on the shaft 28 carries a pin 133 engaging the forward end of the pawl 131 so that a slight upward oscillation of the disk 132 will cause the pin 133 to bear against the pawl 131 to unlock the machine. This slight upward oscillation of the disk 132 is effected by means of the depression of one of the special keys 22, the pins 110 of said keys engaging the beveled noses 134 of pawls 135 pivoted to the frame of the machine at 136, the inner ends of said pawls engaging pins 137 formed on the disk 132, so that upon the depression of any key, its pin 110 will act against the beveled nose 134 and thereby lift the pawl 135 and through the pin 137 lift the disk 132 slightly so as to unlock the machine, and the nose 134 then locks in front of the pin 110 and holds the key in depressed position. To release the depressed key a link 138 is provided. Upon the end of this link is a pin 138ª projecting into a cam groove 138ᵇ formed in a disk fast to the lower operating shaft 29, so that upon the operation of the machine the link 138 will be drawn downward and the disk 132 rotated still farther so as to carry pins 139 against the aforesaid pawls 135 and thereby lift all of the same so as to release any previously depressed key. The link 138 is attached to the rearward extension of the aforesaid disk 132 by means of an enlarged bearing 139ª which enlargement permits the initial machine unlatching movement of the disk 132 independently of the link 138.

*Strip and check printing devices.*—Upon the right-hand end of the machine as shown in Fig. 2 a detail strip and check mechanism is provided. The aforesaid transverse shafts 91 have upon their right-hand extensions pinions 140 which mesh with racks 141 formed on segments 142 upon the upper portion of which segments are carried amount type carriers 143 for printing on a detail strip and on the lower portion of which segments are formed similar amount characters 144 for printing upon a check. The aforesaid transverse shaft 116 which as described in connection with Fig. 11 is set differentially by means of the special keys 22, is extended through to this same right-hand end of the machine and meshes with a rack 145 carrying duplicate printing characters for printing on the detail strip and the check in conjunction with the amounts. The detail strip 146 has the impression taken thereon by means of the printing platen 147 which is reciprocated at each operation of the machine by means of a suitable cam fast upon the upper operating shaft 28, and the check paper 148 is printed upon by means of a check platen 149 which is also similarly operated by means of a cam on the shaft 28. The check paper is fed forward by means of a feed roller 148ª fast to the aforesaid gear wheel 31, and suitable knife mechanism is provided for severing the check. This knife mechanism comprises a cam fast to the pinion 33 and given thereby complete rotation at each operation of the machine, this cam serves to reciprocate a movable knife blade past the stationary knife blade as is usual in machines of this type thereby severing the strip into suitable checks. The detail strip platen 147 carries a pawl 147ª which feeds detail strip paper forward at each reciprocation of the platen.

*Detail and total printing.*—In addition to the detail strip printing device just above described, another detail printing device is provided in conjunction with a total printing device all of which will now be described.

As shown in Figs. 4, 5 and 6, each actuating segment 40 has fast on the rearward portion thereof a laterally extending arm 150, these arms extending horizontally to the center of the machine to a common printing point as shown in Fig. 6, and at their inner extremities these arms are provided with type carrying surfaces bearing the designations of the different amounts, and these amount type carriers will be set differentially according to the differential setting movements of the actuating segments 40 so as to bring to the printing line the type corresponding to the keys depressed. These detail amount type carriers are designated in Fig. 6 as 151 and it will be observed that they are spaced apart so as to include between them another set of type carriers which constitute the total printing type carriers 152. These total printing type carriers are set in the following manner. As shown in Figs. 3 and 4 each counter wheel 80 has fast upon its side a snail cam 153 against which there rests a pin 154 on the forward end of a rock frame 155. The rearward end of each frame carries a segmental rack 156 meshing with a rack arm 157 pivoted on the lower shaft 29 and carrying an upwardly extending rack arm 158 meshing with a rack 159 carried upon arms 160 pivoted loosely about the upper shaft 28 and carrying laterally extending arms 161 upon the inner ends of which are the aforesaid total printing type 152. In the position of the parts shown in Fig. 4 the counter wheel is represented as being at zero and the rock frame 155 is by a suitable spring tension drawn against the snail cam 153 to the limit of the forward movement of said rock frame so that the total printing type carrier for this wheel stands in zero printing position, but as the counter wheel begins to move the snail cam 153 forces the rock frame 155 backward and thereby sets the arm 160 and the total printing type carrier 152 correspondingly, so that these total printing type carriers at any instant show by their numerals at the printing line the exact amount which is on the main total counter, whereas the alternately spaced detail type carriers 151 show the amount of any particular transaction. A special clerks' type carrier 162 (see Fig. 6) is provided which is actuated from the clerks' bank of keys in the same manner in which the amount type carriers are actuated, and the aforesaid special type carrier 118 (see Fig. 11) which is set differentially by the special keys 22 is positioned suitably in proximity to these detail and total type carriers so as to print the nature of the special transaction on the same printing line. The mechanism for printing these totals and the details will now be described.

A laterally shiftable carriage is provided for carrying the paper strip for printing the details of the special transactions and the totals. This carriage comprises a side frame 170 (see Fig. 12), said side frame carrying collars 171, 172 and 173, the collar 171 being fast on a shaft 174 and the collars 172 and 173 being loosely mounted on shafts 175 and 176 respectively. A totalizer handle 177 is provided which is fast to the aforesaid shaft 176 which shaft 176 extends through to the right-hand side of the machine (the left in Fig. 12) and as shown in Fig. 3 the outer end of this shaft 176 has fast upon it a gear wheel 178 which meshes with a gear wheel 179 which in turn meshes with a pinion 180 and the pinion 180 meshes with an upper gear wheel 181. The gear wheel 181 is mounted loosely upon the extension of the shaft 174 and upon its side has fast a diagonally cut or beveled disk 182 which coöperates with an oppositely beveled disk 183 fast upon the said shaft 174 so that upon the rotation of the gear wheel 181 the two opposite beveled surfaces will bear against each other and the disk 182 will force the disk 183 outward thereby carrying the shaft 174 outward and thus laterally shifting the carriage attached at the other end of said shaft, a spring 184 tending to restore the carriage to normal position. The gear wheel 179 has fast on its side a beveled disk 185 coöperating with an oppositely beveled disk 186 fast upon the end of a shaft 187 which extends through to and is fast to the aforesaid shifting carriage so that the rotation of the gear wheel 179 also tends to shift the carriage through the medium of these beveled disks 185 and 186 in the same manner as the beveled disks 182 and 183, the spring 188 tending to restore the shaft 187 to normal position.

The platen hammer 190 is as shown in Fig. 12$^b$, formed with alternate notches 191 and projections 192. The platen carrying arm 193 is pivoted upon the shaft 176 but moves laterally with the carriage, being carried laterally by the collar 173 and another collar 194 situated upon the other side of the platen arm. In the normal position of the carriage, the platen projections 192 stand directly opposite the detail amount printing type carriers 151 which as above described are arranged alternately with the total printing type carriers 152, and the notches 191 stand opposite these total printing type carriers so that when the platen is carried against the type wheels an impression will be taken only from the detail type carriers. When however the totalizer handle 177 is given a half rotation downward, the gear wheels 178, 179 and 181 will also be given a half rotation and the carriage will be shifted laterally to the right (the left in Fig. 12), and since the carriage also carries the platen hammer with it, the notches 191 will now be brought in alinement with the detail printing type carriers and the projections 192 will be brought into alinement with the total printing type carriers so that upon the operation of the platen an impression will be taken from the total printing type carriers, and since the paper upon which these impressions are taken is also carried upon the shifting carriage and shifts bodily with the platen hammer without any change in the relative positions between the hammer and the paper, the columnated arrangement of figures will of course be preserved, that is the total amount will be printed in such manner that its various digits are in the same column with the corresponding digits of the detailed amounts of which the total printed amount represents the sum.

The means for actuating the platen hammer to take an impression upon the paper, comprises a cam 200 fast upon the lower operating shaft 29, this cam acting upon the forwardly extending platen arm 193, and the cam being widened as shown in Fig. 12 so that it will act upon the platen arm 193 in either shifted position of the platen arm.

*Paper feed devices.*—The paper upon which the amounts are printed is carried upon a storage roller 201 mounted loosely on the aforesaid shaft 174 and the paper is then led between the type carriers and the platen hammer and thence to a feed roller 202 upon the side of which is a widened feed ratchet 203. This feed ratchet is adapted to be engaged by a feed pawl 204 carried upon the rearward end of a link 205 which is spring drawn forward by means of a spring 206 and is actuated rearward by means of the aforesaid cam 200 which acts upon a pin 207 carried upon the link 205, so that upon the operation of the machine the cam 200 operates the feed pawl 204 to feed the paper; and near the end of the operation of the machine as soon as the feeding has stopped, the cam 200 has carried the platen arm downward sufficiently to force the platen hammer 190 against the type to take an impression, and near the very end of the complete revolution of the cam 200 the platen arm 193 is free to drop off of the cam and return to normal position under suitable spring tension, and such of the detail printing type carriers as have been actuated are now free from the pressure of the platen against the same so that they may spring back to normal zero position under the tension of their restoring springs as above described. An ink ribbon 210 is led over suitable guide rollers on the shifting carriage and extends between the type carriers and the paper. The feed ratchet 203 is widened so that the feed pawl 204 will engage the same in either of the shifted positions of the carriage.

For the purpose of giving an abnormal feed to the paper when the total is printed, whereby to separate the total amount from the detail amounts and thus permit the ready identification of the same, the aforesaid shaft 176 which is rocked by the totalizer handle 177, has fast upon it as shown in Fig. 12ª a heart shaped cam 220 which acts against a pin 221 on the rearward end of the aforesaid link 205 so that upon the swinging of the totalizer handle to its lower position whereby the shaft 176 is given a half revolution, the cam 220 will during the first quarter revolution act upon the pin 221 to carry the same rearward and feed the paper the usual amount and then upon the next quarter revolution permit the pin 221 to return to normal position. As soon as this totalizer handle has been given this one-half turn, the main operating handle of the machine is now operated to operate the machine in the usual manner, and this operation of the machine simply actuates the aforesaid platen operating cam 200 to take an impression from the total printing type carriers, but just prior to this impression the ordinary feed mechanism is operated, that is the cam 200 acts against the pin 207 to give the feed pawl 204 its normal feeding movement so that the resultant extent of feed for this total printing is now double that of the normal feed so that the total amount will be separated from its preceding detail amount by a double space. As soon as the total has thus been printed by the operation of the machine, the totalizer handle 177 is now restored to its normal upper position and of course this reverse movement of the feed cam 220 again reciprocates the feed pawl 204 and thus gives a single line spacing movement to the paper so that upon the next operation of the machine for the ordinary detail printing, the usual machine feed will take place before the printing, which added to this other feed caused by the return of the totalizer handle 177 makes still another double line spacing movement of the paper separating the previous total from the following detail printing, so that in this manner the total amounts are clearly separated by double line spacing on either side of the total.

While the form of mechanism here shown and described is admirably adapted to fulfil the objects primarily stated, it is to be understood that it is not intended to confine the invention to the one form of embodiment herein disclosed, for it is susceptible of embodiment in various forms all coming withing the scope of the claims which follow.

Having thus described the invention what is claimed as new is:

1. In a cash register, the combination with a differentially movable setting element, and a type carrier controlled thereby, of an operating cam having a uniform excursion at each operation of the machine; and differentially positioned projections carried by said setting element positioned and constructed to be engaged by said cam at different points on its operating surface to impart differential setting movements to said setting element.

2. In a cash register, the combination with a setting element and a type carrier controlled thereby, of differentially spaced projections carried by said setting element; and an operating cam for said setting element, said cam being formed with an operating edge for operating said element differentially according to the projection engaged, and said cam also having a holding edge for maintaining the setting element in its adjusted position during a certain period of movement of said cam.

3. In a cash register, the combination with a differentially movable setting element, and a type carrier controlled thereby, of an operating cam having a uniform excursion at each operation of the machine; differentially positioned projections carried by said setting element and engaged by said cam to impart differential setting movements to said setting element; and a stationary abutment positioned to coöperate with said projections on said setting element to prevent overthrow movement of the same.

4. In a cash register, the combination with a setting element and a type carrier controlled thereby, of differentially spaced projections carried by said setting element; an operating cam for said setting element, said cam being formed with an operating edge for operating the setting element differentially according to the projection engaged, and said cam also having a holding edge for maintaining the setting element in its adjusted position during a certain period of movement of said cam; and a stationary abutment positioned to be engaged by said projections on said setting element when the holding portion of said cam has been moved into operative position, whereby to prevent overthrow movement of said setting element.

5. In a cash register, the combination with a differentially movable setting element, and registering and printing devices set thereby, of a main operating mechanism; an operating cam moved by said operating mechanism and having a complete rotation at each operation of the machine; differentially positioned movable projections carried by said setting element; and manipulative means for operating any desired one of said projections to carry the same into the path of said operating cam.

6. In a cash register, the combination with a setting element and accounting devices controlled thereby, of an operating mechanism; a series of spring pressed plungers carried by said setting element; an operating cam moved by said operating mechanism; a series of keys; and a second series of spring pressed plungers controlled by said series of keys and positioned to abut against the corresponding spring pressed plungers of the setting element when said setting element is in normal position, whereby the operation of any key will displace its plunger and the corresponding setting element plunger to carry the setting element plunger into position to be engaged by said operating cam.

7. In a cash register, the combination with a series of setting elements for actuating accounting devices, and means for imparting differential movements thereto, of a series of value keys for determining the extent of differential movements; a main total counter controlled by said setting elements; a series of department counters arranged for operation by said setting elements; a series of keys for predetermining which of said department counters shall be operated; an element moved differentially by said special keys; accounting devices operated thereby and means connected with said differential element for controlling the operation of said main total counter.

8. In a cash register, the combination with an operating cam having a constant excursion at each operation, a differentially movable element, a plurality of positioned devices carried thereby, means to adjust any desired positioned device into the path of the operating cam, said cam being constructed to engage the positioned devices at different points on its operating surface, and an accounting device operated by said differentially movable element.

9. In a cash register, the combination with a series of detail printing type carriers, of a series of total printing type carriers alternately arranged with respect to said detail printing type carriers, said detail carriers and total carriers having a common printing line; and means for printing at will from either set of type carriers.

10. In a cash register, the combination with a series of detail printing type carriers, of a series of total printing type carriers alternately arranged with respect to said detail printing type carriers, said detail carriers and total carriers having a common printing line; a platen having alternate notches and projections corresponding to the alternate arrangement of the detail and total printing type carriers; and means for shifting said platen at will to bring the projections thereof into alinement with either said detail type carriers or said total type carriers whereby to cause a detail printing or a total printing at will.

11. In a cash register, the combination with a series of actuating elements, detail printing type carriers controlled thereby, and a counter actuated thereby; of a series of total printing type carriers controlled in position by said counter and alternately arranged with respect to said detail printing type carriers, said detail carriers and total carriers having a common printing line; a platen common to both sets of carriers; and means for causing said platen to take an impression from either set of said carriers at will.

12. In a cash register, the combination with a series of detail printing type carriers, and a series of total printing type carriers arranged alternately with respect to said detail carriers; of a shifting carriage for carrying paper for printing from said carriers; a platen also carried by said carriage, and having provisions permitting the printing from either set of carriers; and a manipulative device for shifting said carriage and said platen to cause the printing impression to be taken from either set of carriers at will and at the same time preserve the proper columnated alinement between the detail and total amounts.

13. In a cash register, the combination with detail printing devices for printing the details of each transaction entered on the machine; of total printing devices for printing the totals of said details; a manipulative device for preparing for the printing of a total upon the operation of the machine; a paper feed device; and means controlled by said manipulative device for causing an abnormal feed of the paper both immediately before and immediately after the printing of the total.

14. In a cash register, the combination with detail printing devices for printing a detail of each transaction entered upon the machine, of total printing devices for printing the total of such details; a main operating mechanism; a manipulative device for preparing for the printing of a total upon the operation of the machine; a paper feed device; means connected with the main operating mechanism for causing the paper feed device to give an ordinary line spacing movement upon the printing of details; and means controlled by said manipulative device for causing the paper feed to be given an extra line spacing movement both before and after the printing of a total.

15. In a cash register, the combination with a series of detail printing type carriers, and a series of total printing type carriers alternately arranged with respect to the detail carriers; a shifting carriage for carrying paper for the printing; a notched platen carried by said carriage for taking an impression from either set of carriers; a paper feed mechanism; a main operating mechanism; means connected with the operating mechanism for giving the feed mechanism a normal line spacing movement upon the printing of details; a totalizing handle for shifting said carriage and platen preparatory to the printing of a total; and means operated by said totalizing handle for giving the feed mechanism an extra feed to separate the total printing from the detail printing.

16. In a cash register, the combination with an accounting device, of means for producing a differential motion thereof said means comprising an actuating device having a constant excursion at each operation, an operating element for said accounting device and a plurality of differently positioned devices carried by said element and adapted to be separately employed to connect said element to the actuating device, the differentially positioned devices positioned to be engaged by said actuating device at different points on its operating surface to impart differential setting movements to said setting element.

17. In a cash register, the combination with accounting devices, of two sets of type carriers positioned thereby, the type carriers of one set being alternately spaced with the type carriers of the other set, a special type carrier, all of said type carriers having the same printing line, and means for taking an impression from both the special type carrier and either one or the other of the two sets of type carriers.

18. In a cash register, the combination with accounting devices, of two sets of type carriers positioned thereby, the type carriers of one set being alternately spaced with the type carriers of the other set, a special type carrier, and means for taking an impression from both the special type carrier and either one or the other of the two sets of type carriers.

19. In a cash register, the combination with a series of detail printing type carriers, of a series of total printing type carriers, said detail carriers and total carriers having a common printing line; and means for printing at will from either set of type carriers.

20. In a cash register, the combination with a series of detail printing type carriers, of a series of total printing type carriers, said detail and total carriers having a common printing line, and a platen for taking impressions at will from either set of type carriers.

21. In a cash register, the combination with a series of actuating elements, detail printing type carriers controlled thereby, and a counter actuated thereby; of a series of total printing type carriers controlled in position by said counter, said detail carriers and total carriers having a common printing line; a platen common to both sets of carriers; and means for causing said platen to take an impression from either set of said carriers at will.

22. In a cash register, the combination with a series of detail printing type carriers, and a series of total printing type carriers, of a shifting carriage for carrying paper for printing from said carriers; a platen also carried by said carriage, and having provisions permitting the printing from either set of carriers; and a manipulative device for shifting said carriage and said platen to cause the printing impression to be taken from either set of carriers at will and at the same time preserve the proper columnated alinement between the detail and total amounts.

23. In a cash register, the combination with a total printing mechanism, of means for taking an impression therefrom, manipulative means for controlling the taking of such an impression, a paper feeding device, and means controlled by said manipulative means for giving said device feeding movement both before and after the printing of the total.

24. In a cash register, the combination with manipulative devices, of a member differentially positioned thereby, an indicator having a locking element and a lug, a second lug on said differentially positioned member, a spring for forcing said indicator lug against said second lug, and means for engaging said locking element and thereby arresting said indicator.

25. In a cash register, the combination with manipulative devices, of a differentially movable toothed member controlled thereby, a pinion meshing with said toothed member, an indicator drum, a spring normally urging the indicator drum to its zero position, a lug carried by the indicator drum, a lug on the pinion positioned to engage the lug on the indicator drum and rotate the same against the action of the spring, and means for locking the indicator drum in any of its set positions.

26. In a cash register, the combination with a driving cam having a camming and a circular portion, of means for rotating said cam in a constant direction, a pivoted element, and a plurality of spaced connecting devices carried by said element, means for projecting any of said connecting devices into the path of said cam, and an accounting device actuated by said pivoted element.

27. In a cash register, the combination with a camming device, having a camming and a circular portion, of a pivoted element and a series of spaced connecting devices carried by said pivoted element, means for projecting any of said connecting devices into the path of said camming device, a circular rib against which said connecting devices strike, and an accounting device actuated by said pivoted element.

28. In a cash register, the combination with a camming device having a camming and a lost motion portion, of means for giving said camming device invariable excursions, a differentially movable driving element, and a series of spaced connecting devices carried by said driving element and normally positioned parallel to the camming portion of said camming device, manipulative means for projecting any of said connecting devices into the path of said camming device, and an accounting device driven by said driving element.

29. In a cash register, the combination with a pivoted driving element, and a plurality of spaced connecting devices carried thereby, of a camming device having a camming and a circular portion, means for projecting any connecting device into the path of the camming device, a circular rib between which and the circular portion of the camming device a projected connecting device may be locked, and an accounting element driven by said driving element.

30. In a cash register, the combination with a printing mechanism including type carriers for printing on both a strip and a check, and additional type carriers for a second strip separated from said first mechanism but with connections whereby both printing mechanisms move together, a total printing type carrier positioned to print totals on said second strip only, and means for taking impressions from all said type carriers.

31. In a cash register, the combination with a main operating mechanism, and means for normally latching same, of a segment and means carried thereby for actuating said latching means, a special key, a latch for said key constructed to be moved by depression of said key and to latch said key when depressed, and connections whereby movement of said key latch actuates said segment.

32. In a cash register, the combination with a main operating mechanism, and means for normally latching it, of a key, a device moved by the key for latching said key when the same has been depressed, a releasing segment having provisions for releasing the latching means for the main operating mechanism and a pin borne by the segment and positioned to be engaged and operated by the key latching device.

33. In a machine of the class described, the combination with a differentially adjustable amount determining mechanism, of a totalizer actuated thereby, amount type-carriers spaced apart and having permanent connections to said amount determining mechanism, total printing type-carriers alternated with said amount type carriers, cams movable with elements of said totalizer, and devices, including arms continuously resting on said cams, for maintaining said total type carriers in positions indicative of the total amount accumulated.

34. In a machine of the class described, the combination with a differentially adjustable amount determining mechanism, of a totalizer actuated thereby, amount type carriers spaced apart and having connections whereby they may be adjusted by said determining mechanism, total printing type carriers alternated with said amount type carriers and having a common printing line therewith, graduated devices movable with elements of said totalizer, connections, including arms continuously contacting said graduated devices, for maintaining said total type carriers in positions indicative of the total amount accumulated, a platen common to both sets of type carriers, and means for operating said platen to take impressions from either set thereof.

In testimony whereof I affix my signature in the presence of two witnesses.

JOSEPH P. CLEAL.

Witnesses:
Wm. O. Henderson,
C. B. Foster.